US012562377B2

(12) United States Patent
Oh et al.

(10) Patent No.: US 12,562,377 B2
(45) Date of Patent: Feb. 24, 2026

(54) COMPOSITE NEGATIVE ELECTRODE ACTIVE MATERIAL, METHOD OF PREPARING THE SAME, NEGATIVE ELECTRODE AND SECONDARY BATTERY COMPRISING THE SAME

(71) Applicant: LG ENERGY SOLUTION, LTD., Seoul (KR)

(72) Inventors: Il Geun Oh, Daejeon (KR); Yong Ju Lee, Daejeon (KR); Je Young Kim, Daejeon (KR); Jung Woo Yoo, Daejeon (KR); Ye Lin Kim, Daejeon (KR); Tae Gon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 910 days.

(21) Appl. No.: 17/619,370

(22) PCT Filed: Jul. 23, 2020

(86) PCT No.: PCT/KR2020/009727
§ 371 (c)(1),
(2) Date: Dec. 15, 2021

(87) PCT Pub. No.: WO2021/020805
PCT Pub. Date: Feb. 4, 2021

(65) Prior Publication Data
US 2022/0367855 A1      Nov. 17, 2022

(30) Foreign Application Priority Data

Jul. 26, 2019    (KR) ........................ 10-2019-0091148

(51) Int. Cl.
*H01M 4/36*          (2006.01)
*H01M 4/04*          (2006.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
CPC .. H01M 4/366; H01M 4/0404; H01M 4/0471; H01M 4/485; H01M 4/583;
(Continued)

(56)            References Cited

U.S. PATENT DOCUMENTS

2008/0193831 A1      8/2008  Mah et al.
2012/0052656 A1      3/2012  Bellman et al.
(Continued)

FOREIGN PATENT DOCUMENTS

CN          108336317 A      7/2018
CN          108461723 A      8/2018
(Continued)

OTHER PUBLICATIONS

International Search Report (PCT/ISA/210) issued in PCT/KR2020/009727 mailed on Nov. 2, 2020.
(Continued)

*Primary Examiner* — Raymond Alejandro
(74) *Attorney, Agent, or Firm* — Birch, Stewart, Kolasch & Birch, LLP

(57)            ABSTRACT

Disclosed is a composite negative electrode active material comprising silicon-based core particles, an outer carbon coating layer present on the silicon-based core particles, and single-walled carbon nanotubes, wherein the single-walled carbon nanotubes are in contact with the outer carbon coating layer and comprise a body partially spaced apart from the outer carbon coating layer, and the outer carbon coating layer comprises oxygen in an amount of 35 wt % to 55 wt % therein.

15 Claims, 5 Drawing Sheets

5.0kV 8.6mm x30.0k SE(M)                    1.00um

(51) Int. Cl.

| | |
|---|---|
| *H01M 4/485* | (2010.01) |
| *H01M 4/583* | (2010.01) |
| *H01M 10/0525* | (2010.01) |
| *H01M 50/46* | (2021.01) |
| *H01M 4/02* | (2006.01) |

(52) U.S. Cl.

CPC ........... *H01M 4/485* (2013.01); *H01M 4/583* (2013.01); *H01M 10/0525* (2013.01); *H01M 50/46* (2021.01); *H01M 2004/027* (2013.01)

(58) Field of Classification Search

CPC .......... H01M 10/0525; H01M 10/052; H01M 50/46; H01M 2004/027

See application file for complete search history.

(56) References Cited

U.S. PATENT DOCUMENTS

| | | | |
|---|---|---|---|
| 2013/0059203 A1 | 3/2013 | Hong et al. |
| 2013/0149549 A1 | 6/2013 | Borrelli et al. |
| 2013/0209781 A1 | 8/2013 | Bellman et al. |
| 2013/0220211 A1 | 8/2013 | Dutta |
| 2014/0154578 A1 | 6/2014 | Yoo et al. |
| 2015/0291470 A1 | 10/2015 | Borrelli et al. |
| 2015/0349333 A1 | 12/2015 | Park et al. |
| 2016/0126698 A1 | 5/2016 | Nishio et al. |
| 2016/0190597 A1 | 6/2016 | Kim et al. |
| 2016/0197343 A1 | 7/2016 | Jeong et al. |
| 2017/0033353 A1 | 2/2017 | Behan et al. |
| 2017/0047584 A1 | 2/2017 | Hwang et al. |
| 2017/0110722 A1 | 4/2017 | Lee et al. |
| 2017/0133663 A1 | 5/2017 | Kang et al. |
| 2017/0149059 A1 | 5/2017 | Dutta et al. |
| 2017/0271651 A1 | 9/2017 | Behan et al. |
| 2019/0207221 A1 | 7/2019 | Son et al. |
| 2020/0220170 A1 | 7/2020 | Dutta et al. |

FOREIGN PATENT DOCUMENTS

| | | | | |
|---|---|---|---|---|
| EP | 3113256 A1 * | 1/2017 | .......... | H01M 10/052 |
| EP | 2874208 B1 * | 1/2019 | .......... | H01M 4/0416 |
| JP | 2015-502025 A | 1/2015 | | |
| JP | 6003648 B2 | 10/2016 | | |
| JP | 2017-84759 A | 5/2017 | | |
| KR | 10-2008-0076075 A | 8/2008 | | |
| KR | 10-2011-0124728 A | 11/2011 | | |
| KR | 10-2013-0016727 A | 2/2013 | | |
| KR | 10-2015-0121694 A | 10/2015 | | |
| KR | 10-2015-0137888 A | 12/2015 | | |
| KR | 10-2016-0081688 A | 7/2016 | | |
| KR | 10-2016-0085089 A | 7/2016 | | |
| KR | 10-2017-0044360 A | 4/2017 | | |
| KR | 10-2017-0074030 A | 6/2017 | | |
| KR | 10-2017-0090449 A | 8/2017 | | |
| KR | 10-2019-0083613 A | 7/2019 | | |
| WO | WO 2018/005187 A1 | 1/2015 | | |
| WO | WO 2019/059438 A1 | 3/2019 | | |

OTHER PUBLICATIONS

Extended European Search Report for European Application No. 20847018.7, dated Jul. 8, 2022.

* cited by examiner 5.0kV 8.6mm x30.0k SE(M)                                    1.00um 5.0kV 8.8mm x40.0k SE(M)                                    1.00um 5.0kV 8.8mm x15.0k SE(M)                                    3.00um

COMPOSITE NEGATIVE ELECTRODE ACTIVE MATERIAL, METHOD OF PREPARING THE SAME, NEGATIVE ELECTRODE AND SECONDARY BATTERY COMPRISING THE SAME

CROSS-REFERENCE TO RELATED APPLICATION

This application claims priority to and the benefit of Korean Patent Application No. 10-2019-0091148, filed on Jul. 26, 2019, the disclosure of which is incorporated herein by reference in its entirety.

TECHNICAL FIELD

The present invention relates to a composite negative electrode active material, a method of preparing the same, a negative electrode and a secondary battery comprising the same.

BACKGROUND ART

Recently, with the rapid spread of electronic devices using batteries, such as a mobile phone, a notebook computer, an electric vehicle, and the like, the demand for a secondary battery that is small in size and light in weight but has a relatively high capacity is rapidly increasing. In particular, lithium secondary batteries are light in weight and have a high energy density, and thus are receiving the spotlight as a driving power source for portable devices. Accordingly, efforts on research and development for improving the performance of the lithium secondary battery have been actively made.

The lithium secondary battery generally comprises a positive electrode, a negative electrode, a separator interposed between the positive electrode and the negative electrode, an electrolyte, an organic solvent, and the like. In addition, in the positive electrode and the negative electrode, an active material layer comprising positive electrode active materials or negative electrode active materials may be formed on a current collector. In general, lithium-containing metal oxides such as $LiCoO_2$, $LiMn_2O_4$, and the like are used as the positive electrode active materials in the positive electrode, and thus, carbon-based active materials or silicon-based negative electrode active materials which do not contain lithium are used as the negative electrode active materials in the negative electrode.

In particular, among the negative electrode active materials, silicon-based negative electrode active materials have attracted great attention in that the capacity thereof is about 10 times higher than that of carbon-based negative electrode active materials and have an advantage in which even a thin electrode is capable of realizing high energy density due to their high capacity. However, the silicon-based negative electrode active materials have not been commonly used due to having a problem in which volume expansion occurs due to charging and discharging, active material particles are cracked/damaged due to the volume expansion, and accordingly, lifespan characteristics are deteriorated.

In particular, the silicon-based negative electrode active materials have a problem in that a distance between the active materials may increase and an electrical short circuit may occur between the active materials due to the volume expansion/contraction caused by charging and discharging, and accordingly, electric charge moving paths may be lost and lithium ions may be isolated, thereby reducing capacity and accelerating lifespan deterioration.

Accordingly, there is a need to develop a secondary battery which has improved lifespan characteristics while realizing high capacity and high energy density of the silicon-based negative electrode active material.

Korean Unexamined Patent Publication No. 10-2017-0074030 relates to a negative electrode active material for a lithium secondary battery, a method of preparing the same and a lithium secondary battery comprising the same and discloses a negative electrode active material comprising a porous silicon-carbon composite, but there is a limitation in solving the above-described problems.

PRIOR ART DOCUMENT

Patent Documents

Korean Unexamined Patent Publication No. 10-2017-0074030

DISCLOSURE

Technical Problem

The present invention is directed to providing a composite negative electrode active material capable of effectively preventing an electrical short circuit between active materials caused by charging and discharging when a silicon-based active material is used, and improving lifespan characteristics.

The present invention is also directed to providing a method of preparing the above-described composite negative electrode active material.

The present invention is also directed to providing a negative electrode and a secondary battery which comprise the above-described composite negative electrode active material.

Technical Solution

One aspect of the present invention provides a composite negative electrode active material comprising silicon-based core particles, an outer carbon coating layer formed on the silicon-based core particles, and single-walled carbon nanotubes, wherein the single-walled carbon nanotubes are in contact with the outer carbon coating layer and comprise a body partially spaced apart from the outer carbon coating layer, and the outer carbon coating layer comprises oxygen in an amount of 35 wt % to 55 wt % therein.

Another aspect of the present invention provides a method of preparing a composite negative electrode active material comprising the steps of mixing silicon-based core particles, a precursor for forming an outer carbon coating layer, and single-walled carbon nanotubes and heat-treating the mixture at 250° C. to 650° C.

Still another aspect of the present invention provides a negative electrode comprising a negative electrode current collector and a negative electrode active material layer formed on the negative electrode current collector, wherein the negative electrode active material layer comprises a negative electrode material comprising the above-described composite negative electrode active material, a binder, and a conductive material.

Yet another aspect of the present invention provides a secondary battery comprising the above-described negative electrode, a positive electrode facing the negative electrode, a separator interposed between the negative electrode and the positive electrode, and an electrolyte.

Advantageous Effects

A composite negative electrode active material of the present invention comprises silicon-based core particles, an outer carbon coating layer formed on the silicon-based core particles, and single-walled carbon nanotubes, wherein the single-walled carbon nanotubes are in contact with the outer carbon coating layer and comprise a body partially spaced apart from the outer carbon coating layer, and the outer carbon coating layer comprises oxygen at a specific content. A part of the single-walled carbon nanotubes is attached to the outer carbon coating layer, and the remaining part thereof, which is not attached to the outer carbon coating layer, is spaced apart from the outer carbon coating layer and exposed to the outside of the composite negative electrode active material, so that the single-walled carbon nanotubes can form a conductive network that prevents an electrical short circuit from occurring between active materials, thereby preventing the electrical short circuit between active materials even when the volume expansion/contraction of the active materials occurs due to charging and discharging. In addition, since a part of the single-walled carbon nanotubes is attached and fixed to the outer carbon coating layer, the conductive network can be uniformly and stably formed in a negative electrode, thereby improving lifespan characteristics of the negative electrode and a secondary battery.

In addition, according to a method of preparing a composite negative electrode active material of the present invention, a composite negative electrode active material is prepared by mixing silicon-based core particles, a precursor for forming an outer carbon coating layer, and single-walled carbon nanotubes, and then forming the mixture as a composite in a specific temperature range. Accordingly, a carbon coating layer can be prevented from being carbonized by heat treatment at an excessively high temperature, so that the single-walled carbon nanotubes can be partially attached to the carbon coating layer at an appropriate level and can contribute to the formation of a conductive network between active materials.

MODES OF THE INVENTION

Figure 1:
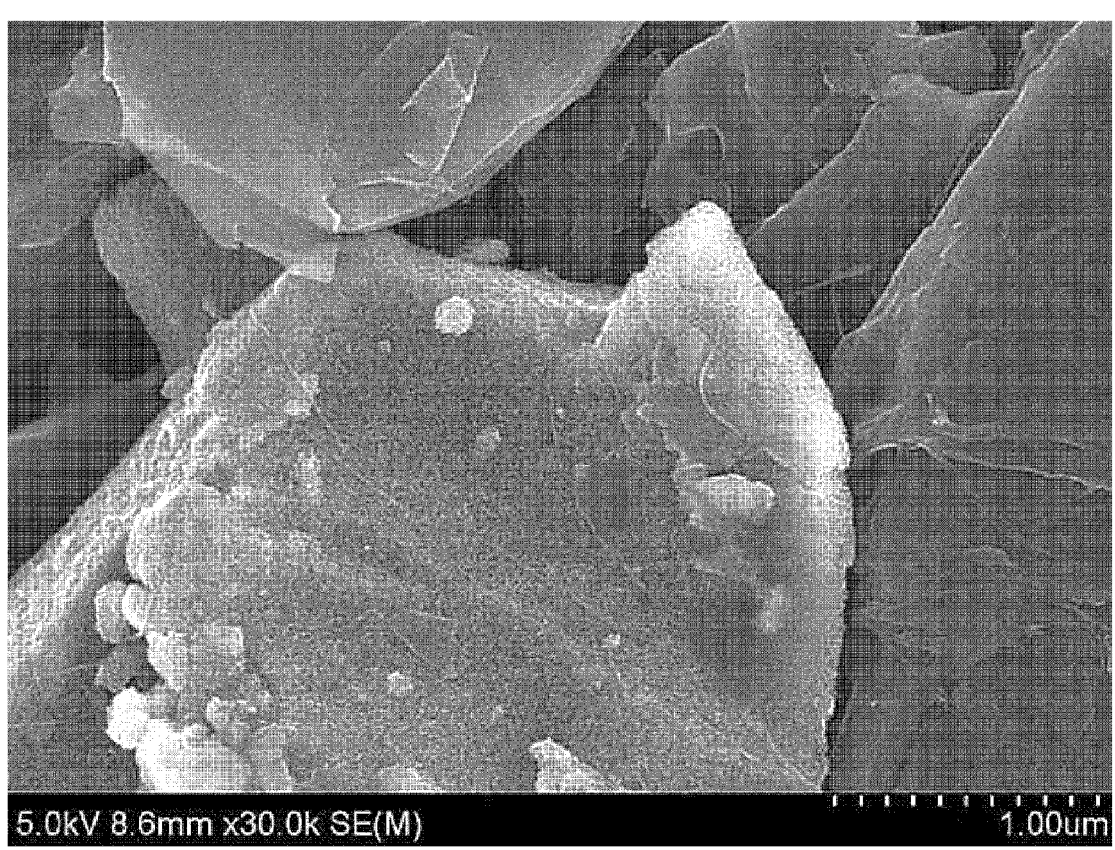
FIG. 1 is a scanning electron microscope (SEM) image showing a composite negative electrode active material of Example 1.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

The terms used in the present specification are only used to describe specific various embodiments and are not intended to limit the present invention. As used herein, singular forms are intended to comprise plural forms as well, unless the context clearly indicates otherwise.

It should be understood that the terms "comprising, "comprising," and/or "having," when used herein, specify the presence of stated features, integers, steps, operations, elements, components and/or combinations thereof, but do not preclude the presence or addition of at least one other features, integers, steps, operations, elements, components and/or combinations thereof.

In the present specification, an average particle diameter ($D_{50}$) may be defined as a particle diameter corresponding to 50% in a cumulative volume-based particle diameter distribution curve. The average particle diameter ($D_{50}$) may be measured using a laser diffraction method. The laser diffraction method may be used to measure a particle size in the range from submicrons to several milli meters, and may obtain results with high reproducibility and high resolution.

Hereinafter, the present invention will be described in detail.

Composite Negative Electrode Active Material

The present invention relates to a composite negative electrode active material. The composite negative electrode active material may be preferably used in a lithium secondary battery.

The composite negative electrode active material of the present invention comprises: silicon-based core particles; an outer carbon coating layer formed on the silicon-based core particles; and single-walled carbon nanotubes (hereinafter, referred to as "SWCNTs"), wherein the SWCNTs are in contact with the outer carbon coating layer and comprise a body partially spaced apart from the outer carbon coating layer, and the outer carbon coating layer comprises oxygen in an amount of 35 wt % to 55 wt % therein.

In general, the silicon-based negative electrode active material is known to have a capacity about 10 times higher than that of a carbon-based active material, and accordingly, when applied to a negative electrode, even a low thickness silicon-based negative electrode active material is expected to realize a thin film electrode having a high level of energy density. However, the silicon-based negative electrode active material has a problem of lifespan deterioration caused by volume expansion/contraction that occurs as lithium ion is intercalated/deintercalated according to charging and discharging. In particular, when the volume expansion/contraction occurs in the silicon-based active material due to charging and discharging, the distance between active materials increases, so that, the electrical contact between the active materials decreases and an electrical short circuit occurs therebetween. Accordingly, an electric charge moving path may be lost and lithium ions may be isolated, which may cause rapid lifespan deterioration and capacity reduction in a negative electrode.

In order to solve these problems, the composite negative electrode active material of the present invention comprises silicon-based core particles, an outer carbon coating layer formed on the silicon-based core particles, and SWCNTs, and the SWCNTs are in contact with the outer carbon coating layer and comprise a body partially spaced apart from the outer carbon coating layer. Since a part of the body of the SWCNTs is spaced apart from the outer carbon coating layer, a conductive network may be formed between composite negative electrode active materials. Accordingly, in the composite negative electrode active material of the present invention, even when the volume expansion of the silicon-based core particles occurs due to charging and discharging, an electrical short circuit may be prevented due to the formation of the conductive network due to the SWCNTs, which is preferable in view of the lifespan characteristics and the resistance reduction of a negative electrode.

In addition, according to the present invention, since the SWCNTs are in contact with the outer carbon coating layer, the SWCNTs may be uniformly arranged in a negative electrode when the composite negative electrode active material is comprised in a negative electrode, so that a uniform and stable conductive network may be formed in the negative electrode.

The silicon-based core particles enable intercalation/deintercalation of lithium, and may function as core particles of the composite negative electrode active material.

The silicon-based core particles may comprise a compound represented by Formula 1 below, $$M_xSiO_y \qquad \text{[Formula 1]}$$

where, M may be at least one selected from the group consisting of Li, Mg, and Al, $0 \leq x \leq 4$, and $0 \leq y < 2$.

In Formula 1, y is preferably within the above range since $SiO_2$ (in the case that x=0 and y=2 in Formula 1) does not react with lithium ions and thus cannot store lithium. Specifically, in Formula 1, y may be $0.5 \leq y \leq 1.5$ in view of structural stability of the active material.

In Formula 1, M may be contained in view of lowering the ratio of an irreversible phase (e.g., $SiO_2$) of the silicon-based core particles to increase the efficiency of the active material, and M may be at least one selected from the group consisting of Li, Mg, and Al, and preferably, may be at least one selected from the group consisting of Li and Mg.

The silicon-based core particles may have an average particle diameter ($D_{50}$) of 1 μm to 10 μm and preferably 2 μm to 6 μm in view of the fact that the structural stability of the active material may be provided during charging and discharging, the electrical contact may be further maintained when used together with SWCNTs, the problem of an increase in the degree of volume expansion/contraction caused by an excessive increase in particle diameter may be prevented, and the problem that an initial efficiency decreases as the particle diameter is excessively low is prevented.

The silicon-based core particles may be comprised in an amount of 90 wt % to 99.9 wt %, and preferably, 92 wt % to 97 wt % in the composite negative electrode active material. When the silicon-based core particles are comprised within the above range, it is preferable in view of improving the capacity of a negative electrode, and the conductive network formed by SWCNTs may be formed at a smooth level, which will be described below, and thus it is preferable in view of preventing an electrical short circuit due to the volume expansion of the active material and improving lifespan characteristics.

The outer carbon coating layer is formed on the silicon-based core particles, allows the volume expansion/contraction of the silicon-based core particles due to charging and discharging to be properly controlled, and comprises the SWCNTs partially attached thereto to form a composite with the SWCNTs.

The outer carbon coating layer comprises oxygen (O), and the oxygen is comprised in an amount of 35 wt % to 55 wt % in the outer carbon coating layer.

The outer carbon coating layer may be formed by mixing the silicon-based core particles, the SWCNTs, and a precursor for forming the outer carbon coating layer and heat treating the mixture, and oxygen in the precursor for forming the outer carbon coating layer may be reduced by the heat treatment. The composite negative electrode active material of the present invention is heat-treated to an appropriate level and thus comprises the outer carbon coating layer whose oxygen content is adjusted within the above-described range, so that a part of the body of the SWCNTs exposed to the outside by being spaced apart from the outer carbon coating layer may allow a conductive network between composite negative electrode active materials to be more uniformly and stably formed.

When the oxygen content in the outer carbon coating layer is less than 35 wt %, the outer carbon coating layer may be evaluated as being excessively carbonized by the heat treatment, and accordingly, it may be difficult to form a free and flexible conductive network by the SWCNTs because the SWCNTs may be excessively adsorbed or attached onto/to the outer carbon coating layer. When the oxygen content in the outer carbon coating layer is greater than 55 wt %, the level of heat treatment for forming the outer carbon coating layer is not sufficient and thus the SWCNTs may not be fixed at the desired level in the composite negative electrode active material.

The oxygen may be comprised in an amount of 40 wt % to 55 wt %, and preferably, 49 wt % to 52 wt % in the outer carbon coating layer, and an amount of oxygen in this range is preferable because the SWCNTs may be attached to the outer carbon coating layer so that a portion of the body of the SWCNTs is spaced apart from the outer carbon coating layer.

The oxygen content may be realized by selecting a precursor for forming the outer carbon coating layer and controlling the heat treatment temperature.

The oxygen content in the outer carbon coating layer may be measured using X-ray photoelectron spectroscopy (XPS).

The outer carbon coating layer may be comprised in an amount of 0.001 wt % to 0.2 wt %, preferably, 0.01 wt % to 0.1 wt %, and more preferably, 0.05 wt % to 0.078 wt % in the composite negative electrode active material, and an amount of outer carbon coating layer in this range is preferable because the SWCNTs may be sufficiently attached to the outer carbon coating layer so that a portion of the body of the SWCNTs is spaced apart from the outer carbon coating layer.

The SWCNTs are in contact with the outer carbon coating layer, and a part of the body of the SWCNTs is spaced apart from the outer carbon coating layer. The outer carbon coating layer and the SWCNTs are in contact with each other, and a part of the body of the SWCNTs is spaced apart from the outer carbon coating layer, and the other part of the body of the SWCNTs may be attached or adsorbed to/onto the outer carbon coating layer.

The SWCNTs are a type of carbon nanotube with a single cylindrical wall and have a fiber shape. The SWCNTs have a long fiber length due to no breaking occurring during the growth of tubes and also have a high degree of graphitization and high crystallinity, as compared to multi-walled carbon nanotubes (hereinafter, referred to as "MWCNTs").

In the composite negative electrode active material of the present invention, a part of the body of the SWCNTs may be exposed to the outside by being spaced apart from the outer carbon coating layer, and due to the long fiber length, flexibility, and high crystallinity of the SWCNTs, a part of the body of the SWCNTs exposed to the outside may form a conductive network that assists the electrical contact between composite negative electrode active materials. Accordingly, in the composite negative electrode active material of the present invention, the SWCNTs may stably maintain the electrical contact even though active materials expand in volume in a negative electrode due to charging and discharging. Thus, the composite negative electrode active material of the present invention is also preferable in view of the fact that a phenomenon, in which an electrical short circuit occurs due to the volume expansion of the active material and accordingly the lifespan of the active material is rapidly deteriorated, may be effectively prevented, the lifespan characteristics of the negative electrode may be improved, and the electrical contact between the active materials may be smoothly maintained due to the SWCNTs so that resistance may be reduced and efficiency may be improved.

Further, in the composite negative electrode active material of the present invention, since the SWCNTs are in contact with the outer carbon coating layer, the SWCNTs may be uniformly disposed between the active materials and a uniform and stable conductive network may be formed in a negative electrode compared to the case of simply mixing active materials and SWCNTs.

The SWCNTs may have an average length of 3 μm or more, preferably, 4 μm or more, and more preferably, 4.5 μm to 10 μm. The above-described range is preferable in that the conductive network between the active materials may be smoothly maintained.

In the present specification, the average length of the SWCNTs is measured as follows. A solution (comprising a solid content of 1 wt % based on the total weight of the solution) obtained by adding SWCNTs and carboxymethyl-cellulose (CMC) in a weight ratio of 40:60 to water is diluted 1,000× in water. Afterward, 20 ml of the diluted solution is filtered through a filter, and the filter comprising the SWCNTs filtered thereon is dried. One hundred scanning electron microscope (SEM) images of the dried filter are taken, the length of the SWCNTs is measured using an ImageJ program, and an average value of the measured length is defined as the average length of the SWCNTs.

The SWCNTs may have an average diameter of 0.1 nm to 15 nm, and preferably, 2 nm to 7 nm. When an average diameter of the SWCNTs is within the above range, it is preferable in view of preventing the SWCNTs from being cut off and securing flexibility.

In the present specification, the average diameter of the SWCNTs is measured as follows. A solution (comprising a solid content of 1 wt % based on the total weight of the solution) obtained by adding SWCNTs and carboxymethyl-cellulose (CMC) in a weight ratio of 40:60 to water is diluted 1,000× in water. One drop of the diluted solution is dropped on a transmission electron microscopy (TEM) grid, and the TEM grid is dried. The dried TEM grid is observed using TEM equipment (H-7650 manufactured by Hitachi High-Tech Corporation), and the average diameter of the SWCNTs is measured.

A ratio of the average length of the SWCNTs to the average diameter of the SWCNTs may be in a range of 500:1 or more, preferably, 500:1 to 10,000:1, and more preferably 750:1 to 2,000:1, and a ratio in this range is preferable in view of the fact that the SWCNTs may have high conductivity, may be prevented from being broken, and may have improved flexibility.

The SWCNTs may be comprised in an amount of 0.005 wt % to 0.2 wt %, preferably, 0.015 wt % to 0.15 wt %, and more preferably, 0.05 wt % to 0.12 wt % in the composite negative electrode active material, and an amount of SWCNTs in this range is preferable in view of the fact that a phenomenon in which the SWCNTs become entangled and aggregated together with the active material due to excessive SWCNT addition is prevented, and the conductive network may be formed more uniformly while sufficiently improving electrical conductivity.

The composite negative electrode active material of the present invention may further comprise an inner carbon coating layer formed between the silicon-based core particles and the outer carbon coating layer. The inner carbon coating layer inhibits the volume expansion of the silicon-based core particles and may function as a protective layer that prevents a side reaction with an electrolyte solution.

The inner carbon coating layer may be comprised in an amount of 1 wt % to 10 wt %, and preferably, 3 wt % to 7 wt % in the composite negative electrode active material, and an amount of inner carbon coating layer in this range is preferable in view of the fact that side reactions between the inner carbon coating layer and an electrolyte solution may be prevented while controlling the volume expansion of the silicon-based core particles to an excellent level.

The inner carbon coating layer may be comprised in an amount of 1 wt % to 10 wt %, and preferably, 3 wt % to 7 wt % based on the weight of the silicon-based core particles and the inner carbon coating layer, and an amount of inner carbon coating layer in this range is preferable in view of the fact that side reactions between the inner carbon coating layer and an electrolyte solution may be prevented while controlling the volume expansion of the silicon-based core particles to an excellent level.

Method of Preparing Composite Negative Electrode Active Material

Further, the present invention provides a method of preparing the above-described composite negative electrode active material.

Specifically, the method of preparing a composite negative electrode active material of the present invention comprises the steps of: mixing silicon-based core particles, a precursor for forming an outer carbon coating layer, and SWCNTs; and heat-treating the mixture at 250° C. to 650° C.

According to the method of preparing a composite negative electrode active material of the present invention, by mixing the silicon-based core particles, the precursor for forming an outer carbon coating layer, and the SWCNTs and heat-treating the mixture at a specific temperature range, a composite negative electrode active material having a form, in which an outer carbon coating layer is formed on the silicon-based core particles, the SWCNTs are in contact with the outer carbon coating layer, and a part of a body of the SWCNTs is spaced apart from the outer carbon coating layer, is formed.

Further, according to the preparation method, the SWCNTs and the outer carbon coating layer are in contact with each other, and a part of the body of the SWCNTs may be exposed to the outside of the composite negative electrode active material by being spaced apart from the outer carbon coating layer. A part of the body of the SWCNTs exposed to the outside may form a conductive network which improves electrical contact between composite negative electrode active materials. The other part of the body of the SWCNTs, which is not spaced apart from the outer carbon coating layer, may be attached and fixed to the outer carbon coating layer, so that a conductive network may be present between the composite negative electrode active materials at a more stable and uniform level. Thus, the problem of volume expansion due to the use of the silicon-based core particles as an active material and the problem of an electrical short circuit and the resulting deterioration of the lifespan may be effectively prevented.

The method of preparing a composite negative electrode active material of the present invention comprises mixing silicon-based core particles, a precursor for forming an outer carbon coating layer, and SWCNTs.

The type, characteristics, and content of the silicon-based core particles and the SWCNTs are described above.

The precursor for forming an outer carbon coating layer is a component capable of forming an outer carbon coating layer of the composite negative electrode active material.

The precursor for forming the outer carbon coating layer may be at least one selected from the group consisting of carboxymethyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC), and cellulose gum, and may preferably be carboxymethylcellulose.

The method of preparing a composite negative electrode active material of the present invention may further comprise forming an inner carbon coating layer on the silicon-based core particles before the mixing operation. The inner carbon coating layer is formed on the silicon-based core particles to properly control the volume expansion of the silicon-based core particles caused by charging and discharging, and may function as a protective layer capable of preventing side reactions with an electrolyte solution.

The forming of the inner carbon coating layer may be performed by a chemical vapor deposition (CVD) method, and specifically, may be performed by a chemical vapor deposition (CVD) method using at least one hydrocarbon gas selected from the group consisting of methane, ethane, and acetylene. According to the method, the inner carbon coating layer may be formed on the silicon-based core particles at a uniform level, so that the volume expansion of the silicon-based core particles may be smoothly controlled, and the side reactions by the electrolyte solution may be prevented.

The forming of the inner carbon coating layer may be performed at 800° C. to 1,100° C., and preferably, 900° C. to 1,000° C.

The other descriptions of the inner carbon coating layer are given above.

The method of preparing a composite negative electrode active material of the present invention comprises heat-treating the mixture at 250° C. to 650° C.

When the heat treatment temperature is less than 250° C., the content of oxygen in the outer carbon coating layer is excessive, and it is difficult for the SWCNTs to be sufficiently fixed in the carbon coating layer, so that the conductive network may not be uniformly formed in a negative electrode. When the heat treatment temperature is greater than 650° C., the carbon coating layer may be excessively carbonized or the SWCNTs may be attached and fixed in the carbon coating layer more than necessary so that it may be difficult to form a free and flexible conductive network by the SWCNTs.

Preferably, the heat treatment temperature may be in a range of 350° C. to 500° C., and a heat treatment temperature in this range is preferable in view of the fact that the oxygen content in the outer carbon coating layer may be adjusted to an appropriate level, and the SWCNTs may be attached to the outer carbon coating layer while securing the flexibility of the SWCNTs.

The heat treatment may be performed for 0.5 hours to 5 hours, and preferably, 0.7 hours to 2 hours, and a heat treatment time in this range is preferable in view of controlling the degree of attachment or adsorption of the SWCNTs to a desired level and controlling the oxygen content in the outer carbon coating layer to an appropriate level.

According to the method of preparing a composite negative electrode active material of the present invention, oxygen in the precursor for forming the outer carbon coating layer may be reduced by the heat treatment, and the outer carbon coating layer may be formed such that a part of the SWCNTs is attached and fixed to the precursor for forming the outer carbon coating layer. Specifically, the outer carbon coating layer may comprise oxygen in an amount of 35 wt % to 55 wt %, preferably, 40 wt % to 55 wt %, and more preferably, 49 wt % to 52 wt %. When oxygen content is in the above range, it is determined that a part of the SWCNTs is properly attached and fixed in the outer carbon coating layer.

Negative Electrode

The present invention also provides a negative electrode comprising the above-described composite negative electrode active material.

Specifically, the negative electrode of the present invention comprises: a negative electrode current collector; and a negative electrode active material layer formed on the negative electrode current collector, wherein the negative electrode active material layer comprises a negative electrode material, a binder, and a conductive material, and the negative electrode material comprises the above-described composite negative electrode active material.

The negative electrode current collector is not particularly limited as long as it has high conductivity without causing chemical changes in the battery. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may generally have a thickness of 3 μm to 500 μm.

The negative electrode current collector may have fine irregularities formed on a surface thereof to increase the binding force of a negative electrode active material. For example, the negative electrode current collector may be used in various forms such as a film, a sheet, a foil, a net, a porous body, a foamed body, a non-woven fabric, and the like.

The negative electrode active material layer is formed on the negative electrode current collector.

The negative electrode active material layer may comprise a negative electrode material and a binder, and the negative electrode material comprises the above-described composite negative electrode active material.

The composite negative electrode active material may exhibit excellent capacity characteristics by being comprised in the negative electrode, and may contribute to the improvement of the lifespan characteristics of the negative electrode due to the SWCNTs comprised therein.

The description of the composite negative electrode active material is given above.

The negative electrode material may further comprises a carbon-based active material together with the above-described composite negative electrode active material, which is more preferable for reducing resistance and improving efficiency because the volume expansion of the entire negative electrode material may be lowered due to the carbon-based active material whose degree of volume expansion according to charging and discharging is low, and the conductive network due to the SWCNTs in the composite negative electrode active material may surround the carbon-based active material.

The carbon-based active material may comprise at least one selected from the group consisting of artificial graphite, natural graphite, hard carbon, soft carbon, carbon black, acetylene black, Ketjen black, Super P, graphene, and fibrous carbon and preferably comprises at least one selected from the group consisting of artificial graphite and natural graphite.

The carbon-based active material may have an average particle diameter ($D_{50}$) of 5 pm to 35 μm, and preferably, 10 μm to 20 μm in view of providing structural stability and reducing side reactions with an electrolyte solution during charging and discharging.

Specifically, the negative electrode material preferably comprises both the composite negative electrode active material and the carbon-based active material in view of simultaneously improving capacity characteristics and cycle characteristics, and in more detail, the negative electrode material preferably comprises the composite negative electrode active material and the carbon-based active material in a weight ratio of 5:95 to 30:70, and more preferably, 10:90 to 20:80. The above-described range is preferable in view of simultaneously improving capacity characteristics and cycle characteristics.

The negative electrode material may be comprised in an amount of 80 wt % to 99 wt %, and preferably, 90 wt % to 98.5 wt % in the negative electrode active material layer.

The negative electrode active material layer comprises a binder.

The binder may comprise at least one selected from the group consisting of styrene butadiene rubber (SBR), acrylonitrile butadiene rubber, acrylic rubber, butyl rubber, fluoro rubber, polyvinyl alcohol, carboxymethylcellulose (CMC), starch, hydroxypropylcellulose, regenerated cellulose, polyvinyl alcohol (PVA), polyacrylic acid (PAA), polyethylene glycol (PEG), polyacrylonitrile (PAN), and polyacryl amide (PAM) in view of improving electrode adhesion and imparting sufficient resistance to the volume expansion/contraction of the active material. Preferably, the binder may comprise styrene-butadiene rubber in view of having high strength, excellent resistance to the volume expansion/contraction of the silicon-based negative electrode active material, and imparting excellent flexibility to the binder so as to prevent an electrode from being warped, bent, and the like.

The binder may be comprised in an amount of 0.55 wt % to 10 wt % in the negative electrode active material layer, and an amount of binder in this range is preferable in view of more effectively controlling the volume expansion of the active material.

When necessary, the negative electrode active material layer may further comprise a conductive material. The conductive material may be used to improve the conductivity of the negative electrode, and any conductive material that does not cause a chemical change and has conductivity is preferably used. Specifically, the conductive material may comprise at least one selected from the group consisting of natural graphite, artificial graphite, carbon black, acetylene black, Ketjen black, channel black, furnace black, lamp black, thermal black, a conductive fiber, fluorocarbon, aluminum powder, nickel powder, zinc oxide, potassium titanate, titanium oxide, and a polyphenylene derivative and preferably comprises carbon black in view of realizing high conductivity.

The conductive material may be comprised in an amount of 0.5 wt % to 10 wt % in the negative electrode active material layer.

The negative electrode active material layer may have a thickness of 30 μm to 100 μm, and preferably, 40 μm to 80 μm in view of enhancing the electrical contact with components of the negative electrode material due to the above-described SWCNTs and the like.

The negative electrode may be manufactured by dispersing a negative electrode material, a binder, and a conductive material in a solvent for forming a negative electrode slurry on a negative electrode current collector to prepare a negative electrode slurry, coating the negative electrode current collector with the negative electrode slurry, and followed by drying and rolling.

The solvent for forming the negative electrode slurry may comprise at least one selected from the group consisting of distilled water, ethanol, methanol, and isopropyl alcohol, preferably distilled water, in view of facilitating the dispersion of the components.

Secondary Battery

The present invention provides a secondary battery, specifically, a lithium secondary battery, comprising the above-described negative electrode.

Specifically, the secondary battery according to the present invention comprises: the above-described negative electrode; a positive electrode disposed to face the negative electrode; a separator interposed between the negative electrode and the positive electrode; and an electrolyte.

The positive electrode may comprise a positive electrode current collector and a positive electrode active material layer formed on the positive electrode current collector.

The positive electrode current collector is not particularly limited as long as it has high conductivity without causing chemical changes in the battery. Specifically, as the positive electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The positive electrode current collector may generally have a thickness of 3 to 500 μm.

The positive electrode current collector may have fine irregularities formed on a surface thereof to increase the binding force of a positive electrode active material. For example, the positive electrode current collector may be used in various forms such as a film, a sheet, a foil, a net, a porous body, a foamed body, a non-woven fabric, and the like.

The positive electrode active material layer may comprise a positive electrode active material.

The positive electrode active material is a compound enabling reversible intercalation and deintercalation of lithium ion, which may specifically comprise a lithium-transition metal composite oxide comprising lithium and at least one transition metal selected from the group consisting of nickel, cobalt, manganese, and aluminum, and preferably, a lithium-transition metal composite oxide comprising lithium and transition metals comprising nickel, cobalt, and manganese.

More specifically, the lithium-transition metal composite oxide may be a lithium-manganese-based oxide (e.g., $LiMnO_2$, $LiMn_2O_4$, and the like), a lithium-cobalt-based oxide (e.g., $LiCoO_2$ and the like), a lithium-nickel-based oxide (e.g., $LiNiO_2$ and the like), a lithium-nickel-manganese-based oxide (e.g., $LiNi_{1-y}Mn_yO_2$ (where $0<Y<1$), $LiMn_{2-z}Ni_zO_4$ (where $0<z<2$), and the like), a lithium-nickel-cobalt-based oxide (e.g., $LiNi_{1-y1}Co_{y1}O_2$ (where $0<Y1<1$) and the like), a lithium-manganese-cobalt-based oxide (e.g., $LiCo_{1-y2}Mn_{y2}O_2$ (where $0<Y2<1$), $LiMn_{2-z1}Co_{z1}O_4$ (where $0<z1<2$), and the like), a lithium-nickel-manganese-cobalt-based oxide (e.g., $LiNi_pCo_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$) and the like), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg and Mo, each of p2, q2, r3 and s2 is the atomic fraction of elements which are independent of one another, and $0<p2<1$, $0<q2<1$, $0<r3<1$, $0<s2<1$, $p2+q2+r3+s2=1$) and the like), which may be used alone or in a mixture of two or more thereof Among these, in view of improving the capacity characteristics and stability of a battery, the lithium-transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.5}Co_{0.15})O_2$, $Li(Ni_{0.8}Mn_{0.1}Co_{0.1})O_2$, and the like), or a lithium nickel-cobalt-aluminum oxide (e.g., $Li(Ni_{0.8}Co_{0.15}Al_{0.05})O_2$ and the like), and in consideration of significant improvement caused by control of the type and content ratio of constituent elements for forming a lithium-transition metal composite oxide, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, which may be used alone or in a mixture of two or more thereof.

The positive electrode active material may be comprised in an amount of 80 wt % to 99 wt %, and preferably, 92 wt % to 98.5 wt % in the positive electrode active material layer in consideration of sufficiently exhibiting the capacity of the positive electrode active material.

The positive electrode active material layer may further comprise a binder and/or a conductive material in addition to the above-described positive electrode active material.

The binder is a component for assisting the bonding between the active material and the conductive material and the bonding to the current collector. Specifically, the binder may comprise at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, styrene butadiene rubber, and fluorine rubber and preferably comprises polyvinylidene fluoride.

The binder may be comprised in an amount of 1 wt % to 20 wt %, and preferably, 1.2 wt % to 10 wt % in the positive electrode active material layer in view of sufficiently ensuring the bonding between components such as the positive electrode active material.

The conductive material may be used to assist and improve the conductivity of a secondary battery, and is not particularly limited as long as it does not cause a chemical change and has conductivity. Specifically, the conductive material may comprise at least one selected from the group consisting of graphite such as natural graphite, artificial graphite, or the like; a carbon black-based material such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon powder; a metal powder such as aluminum powder, nickel powder, or the like; a conductive whisker consisting of zinc oxide, potassium titanate, or the like; a conductive metal oxide such as titanium oxide or the like; and a polyphenylene derivative and preferably comprises carbon black in view of improving conductivity.

The conductive material may be comprised in an amount of 1 wt % to 20 wt %, and preferably, 1.2 wt % to 10 wt % in the positive electrode active material layer in view of sufficiently ensuring electrical conductivity.

The positive electrode active material layer may have a thickness of 30 μm to 400 μm, and preferably, 50 μm to 110 μm.

The positive electrode may be manufactured by applying a positive electrode slurry comprising a positive electrode active material, and optionally, a binder, a conductive material, and a solvent for forming a positive electrode slurry onto a positive electrode current collector, followed by drying and rolling.

The solvent for forming a positive electrode slurry may comprise an organic solvent such as N-methyl-2-pyrrolidone (NMP) or the like and may be used in an amount suitable for achieving preferable viscosity when the positive electrode active material, and optionally, a binder, a conductive material, and the like are comprised. For example, the solvent for forming a positive electrode slurry may be comprised in the positive electrode slurry such that the concentration of a solid content comprising the positive electrode active material, and optionally, the binder and the conductive material is in a range of 50 wt % to 95 wt %, and preferably, 70 wt % to 90 wt %.

The separator is not particularly limited as long as it is generally used in a lithium secondary battery to separate a negative electrode from a positive electrode and provide a moving path for lithium ions, and particularly, it is preferable that the separator has low resistance to ion movement of an electrolyte and an excellent ability to be impregnated with an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure having two or more layers thereof may be used. In addition, a conventional porous non-woven fabric, for example, a non-woven fabric formed of a high melting point glass fiber or a polyethylene terephthalate fiber may be used. In addition, a coated separator comprising a ceramic component or a polymer material may be used to ensure thermal resistance or mechanical strength, and may be selectively used in a single- or multi-layered structure.

Further, as the electrolyte used in the present invention, an organic liquid electrolyte, an inorganic liquid electrolyte, a solid polymer electrolyte, a gel-type polymer electrolyte, a solid inorganic electrolyte, or a molten inorganic electrolyte that are usable in the manufacture of a secondary battery may be used, but the present invention is not limited thereto.

Specifically, the electrolyte may comprise an organic solvent and a lithium salt.

The organic solvent is not specifically limited so long as it functions as a medium through which ions involved in an electrochemical reaction of a battery can move.

Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R-CN (R is a linear, branched or cyclic C2 to C20 hydrocarbon group, and may comprise a double bonded aromatic ring or an ether bond); an amide-based solvent such as dimethylformamide; a dioxolane-based solvent such as 1,3-dioxolane; or a sulfolane-based solvent may be used. Among these, a carbonate-based solvent is preferably used, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, etc.) is more preferably used. In this case, when a cyclic carbonate and a chain-type carbonate are mixed in a volume ratio of about 1:1 to about 1:9, the electrolyte solution may exhibit excellent performance.

The lithium salt is not particularly limited as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in a range of 0.1 to 2.0 M. When a concentration of lithium salt is in the above-described range, the electrolyte has suitable conductivity and viscosity and thus may exhibit excellent electrolyte performance, and the lithium ions may effectively move.

The secondary battery may be manufactured by a conventional method of manufacturing a secondary battery, that is, by interposing a separator between the above-described negative electrode and positive electrode and injecting an electrolyte solution.

The secondary battery according to the present invention is useful in the field of portable devices such as mobile phones, notebook computers, digital cameras, and the like and electric vehicles such as hybrid electric vehicles (HEVs) and the like and is preferably used, particularly, as a battery constituting a medium-to-large-sized battery module. Accordingly, the present invention also provides a medium-to-large battery module comprising the above-described secondary battery as a unit battery.

Such a medium-to-large battery module is preferably applied to a power source for a device requiring a high output and a large capacity, for example, an electric vehicle, an HEV, or a power storage device.

Hereinafter, examples of the present invention will be described in detail so that those of ordinary skill in the art can easily carry out the present invention. However, the present invention may be embodied in various different forms and is not limited to the examples described below.

EXAMPLES

Example 1: Preparation of Composite Negative Electrode Active Material

Silicon-based core particles SiO (average particle diameter ($D_{50}$): 5 μm) were subjected to chemical vapor deposition (CVD) using methane as hydrocarbon gas at 950° C. to form an inner carbon coating layer on the silicon-based core particles. The inner carbon coating layer was formed at 5 wt % with respect to the total weight of the silicon-based core particles and the inner carbon coating layer.

The silicon-based core particles on which the inner carbon coating layer was formed, carboxymethylcellulose as a precursor for forming an outer carbon coating layer, and SWCNTs were mixed in a weight ratio of 99.83:0.102:0.068.

The SWCNTs had an average length of 5 μm, an average diameter of 5 nm, and an average length/average diameter of 1,000.

The mixture was heat-treated at 450° C. for one hour to prepare a composite negative electrode active material of Example 1, which had a form in which an outer carbon coating layer was formed on the inner carbon coating layer, the SWCNTs were in contact with the outer carbon coating layer, and a part of a body of the SWCNTs was spaced apart from the outer carbon coating layer.

An average particle diameter ($D_{50}$) of the composite negative electrode active material was about 5 μm, and in the composite negative electrode active material, a weight ratio of the silicon-based core particles on which an inner carbon coating layer was formed: outer carbon coating layer: SWCNTs was 99.87:0.06:0.07.

Example 2: Preparation of Composite Negative Electrode Active Material

A composite negative electrode active material of Example 2 was prepared in the same manner as in Example 1, except that the heat treatment temperature was 300° C.

An average particle diameter ($D_{50}$) of the composite negative electrode active material was about 5 μm, and in the composite negative electrode active material, a weight ratio of the silicon-based core particles on which an inner carbon coating layer was formed: outer carbon coating layer: SWCNTs was 99.85:0.08:0.07.

Example 3: Preparation of Composite Negative Electrode Active Material

A composite negative electrode active material of Example 3 was prepared in the same manner as in Example 1, except that silicon-based core particles on which an inner carbon coating layer was formed, a precursor for forming an outer carbon coating layer, and SWCNTs were mixed in a weight ratio of 99.95:0.03:0.02.

An average particle diameter ($D_{50}$) of the composite negative electrode active material was about 5 μm, and in the composite negative electrode active material, a weight ratio of the silicon-based core particles on which the inner carbon coating layer was formed: outer carbon coating layer: SWCNTs was 99.96:0.02:0.02.

Example 4: Preparation of Composite Negative Electrode Active Material

A composite negative electrode active material of Example 4 was prepared in the same manner as in Example 1, except that silicon-based core particles on which an inner carbon coating layer was formed, a precursor for forming an outer carbon coating layer, and SWCNTs were mixed in a weight ratio of 99.75:0.15:0.1.

An average particle diameter ($D_{50}$) of the composite negative electrode active material was about 5 μm, and in the composite negative electrode active material, a weight ratio of the silicon-based core particles on which the inner carbon coating layer was formed: outer carbon coating layer: SWCNTs was 99.82:0.08:0.1.

Comparative Example 1: Preparation of Composite Negative Electrode Active Material A composite negative electrode active material of Comparative Example 1 was prepared in the same manner as in Example 1, except that the heat treatment temperature was 200° C.

An average particle diameter ($D_{50}$) of the composite negative electrode active material was about 5 μm, and in the composite negative electrode active material, a weight ratio of the silicon-based core particles on which an inner carbon coating layer was formed: outer carbon coating layer: SWCNTs was 99.82:0.11:0.07.

Comparative Example 2: Preparation of Composite Negative Electrode Active Material A composite negative electrode active material of Comparative Example 2 was prepared in the same manner as in Example 1, except that the heat treatment temperature was 700° C.

An average particle diameter ($D_{50}$) of the composite negative electrode active material was about 5 μm, and in the composite negative electrode active material, a weight ratio of the silicon-based core particles on which an inner carbon coating layer was formed: outer carbon coating layer: SWCNTs was 99.89:0.04:0.07.

Comparative Example 3: Preparation of Composite Negative Electrode Active Material A composite negative electrode active material of Comparative Example 3 was prepared in the same manner as in Example 1, except that MWCNTs were used instead of SWCNTs, and silicon-based core particles on which an inner carbon coating layer was formed, a precursor for forming an outer carbon coating layer, and the MWCNTs were mixed in a weight ratio of 98.75:0.75:0.5.

The MWCNTs had an average length of 3 μm, an average diameter of 20 nm, and an average length/average diameter of 150.

An average particle diameter ($D_{50}$) of the composite negative electrode active material was about 5 μm, and in the composite negative electrode active material, a weight ratio of the silicon-based core particles on which an inner carbon coating layer was formed: outer carbon coating layer: MWCNTs was 99.1:0.4:0.5.

Comparative Example 4: Preparation of Negative Electrode Active Material

A negative electrode active material of Comparative Example 4 was prepared by mixing the silicon-based core particles on which the inner carbon coating layer was formed, which was used in Example 1, carboxymethylcellulose, and SWCNTs in a weight ratio of 99.83:0.102:0.068.

In the case of the negative electrode active material of Comparative Example 4, the heat treatment was not performed so that the outer carbon coating layer was not formed.

Comparative Example 5: Preparation of Negative Electrode Active Material

A negative electrode active material of Comparative Example 5 was prepared by mixing the silicon-based core particles on which the inner carbon coating layer was formed, which was used in Example 1, carboxymethylcellulose, and SWCNTs in a weight ratio of 99.65:0.21:0.14. In the case of the negative electrode active material of Comparative Example 5, the heat treatment was not performed so that the outer carbon coating layer was not formed.

Here, the average length and the average diameter of the SWCNTs or MWCNTs were measured by the following method.

1) Average Length

A solution (comprising a solid content of 1 wt % based on the total weight of the solution) obtained by adding the SWCNTs (or MWCNTs) used in Examples and Comparative Examples and carboxymethylcellulose (CMC) in a weight ratio of 40:60 to water was diluted 1,000× in water. Afterward, 20 ml of the diluted solution was filtered through a filter, and the filter comprising the SWCNTs (or MWCNTs) filtered thereon was dried. One hundred SEM images were taken of the dried filter, the length of the SWCNTs was measured using an ImageJ program, and an average value of the measured length was defined as the average length of the SWCNTs.

2) Average Diameter

A solution (comprising a solid content of 1 wt % based on the total weight of the solution) obtained by adding the SWCNTs (or MWCNTs) used in Examples and Comparative Examples and carboxymethylcellulose (CMC) in a weight ratio of 40:60 to water was diluted 1,000× in water. One drop of the diluted solution was dropped on a transmission electron microscopy (TEM) grid, and the TEM grid was dried. The dried TEM grid was observed using TEM equipment (H-7650 manufactured by Hitachi h-Tech Corporation), and the average diameter of the SWCNTs was measured.

Experimental Examples

Experimental Example 1: SEM Observation

The appearance of each of the composite negative electrode active materials prepared in Example 1, Example 2, Comparative Example 1, and Comparative Example 2, and the negative electrode active material formed in Comparative Example 4 was observed using SEM.

SEM images of the composite negative electrode active materials of Example 1, Example 2, Comparative Example 1, and Comparative Example 2, and the negative electrode active material of Comparative Example 4 are sequentially illustrated in FIGS. 1 to 5.

Figure 2:
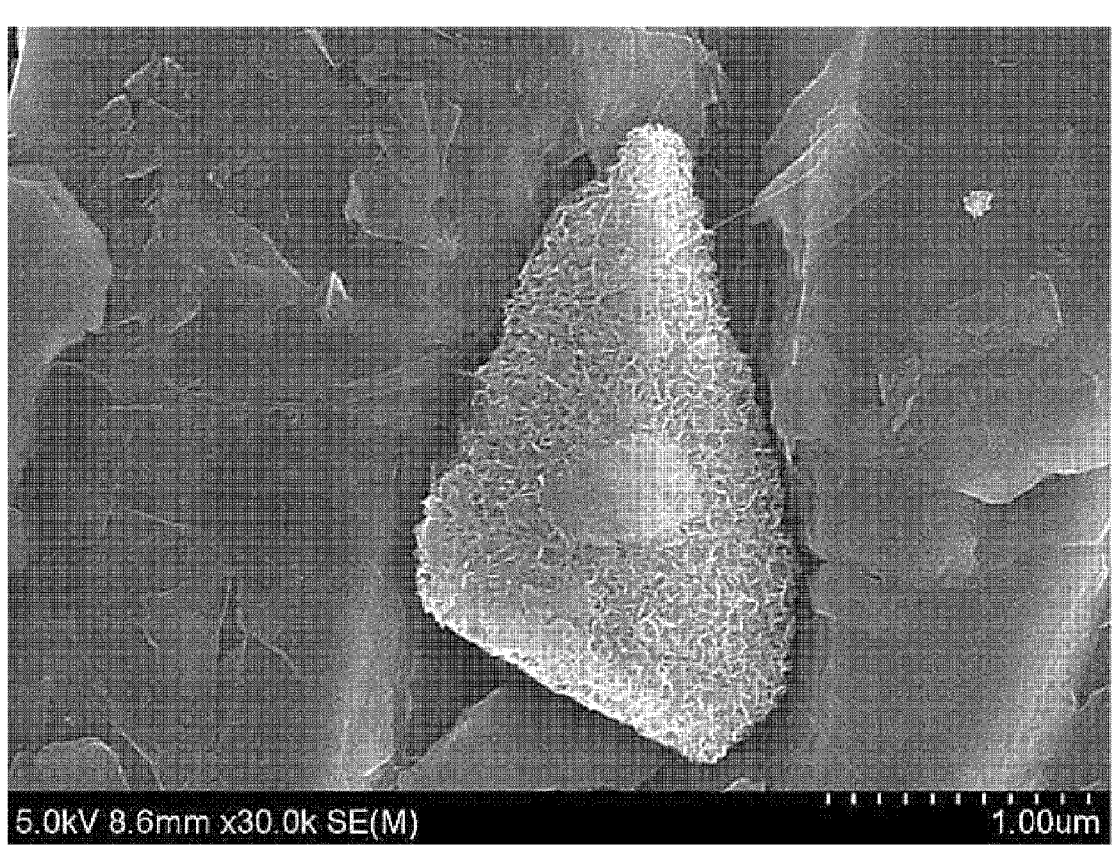
FIG. 2 is an SEM image showing a composite negative electrode active material of Example 2.

Referring to FIGS. 1 and 2, it can be seen that, in the composite negative electrode active materials of Examples 1 and 2, a composite of the silicon-based core particles and the SWCNTs is formed so that a part of a body of the SWCNTs is spaced apart from the outer carbon coating layer.

Figure 3:
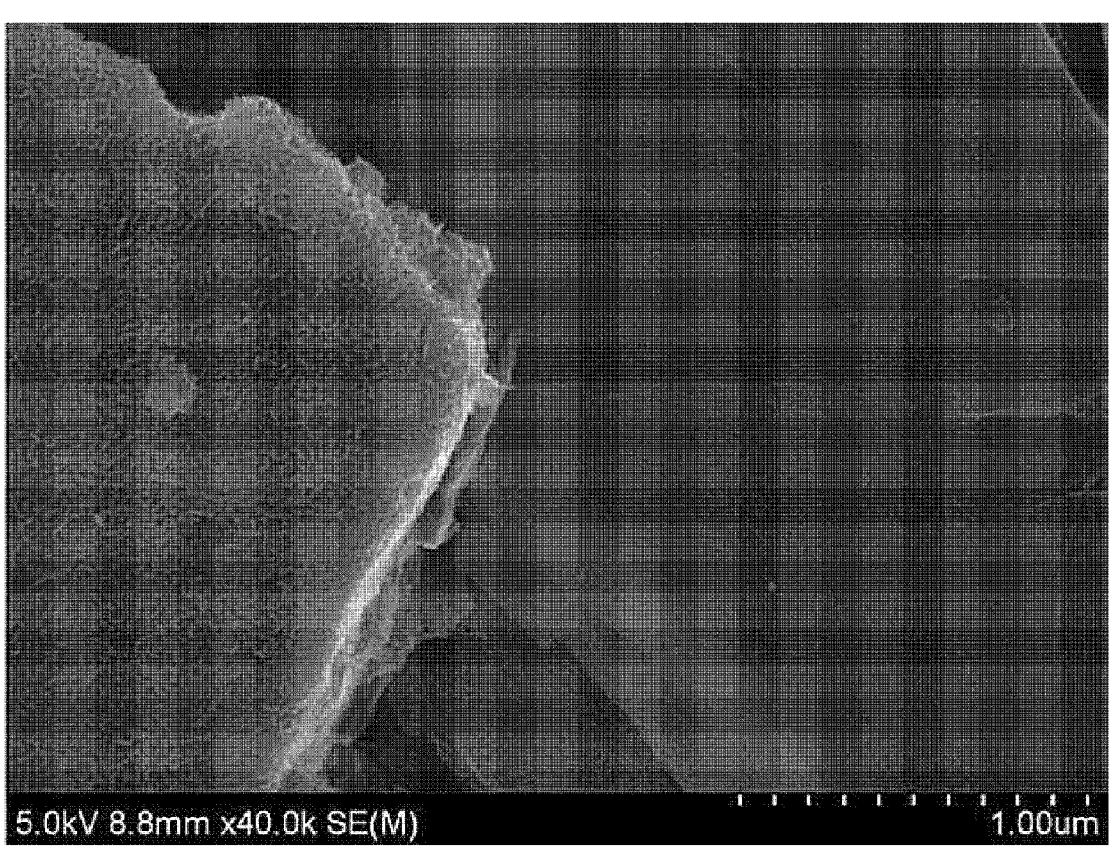
FIG. 3 is an SEM image showing a composite negative electrode active material of Comparative Example 1.

Referring to FIG. 3, it can be seen that, in the composite negative electrode active material of Comparative Example 1, although a composite of the SWCNTs and the silicon-based core particles is formed, the heat treatment is not sufficient and thus the composite is not formed at the desired level, and lifespan characteristics are poor as described below.

Figure 4:
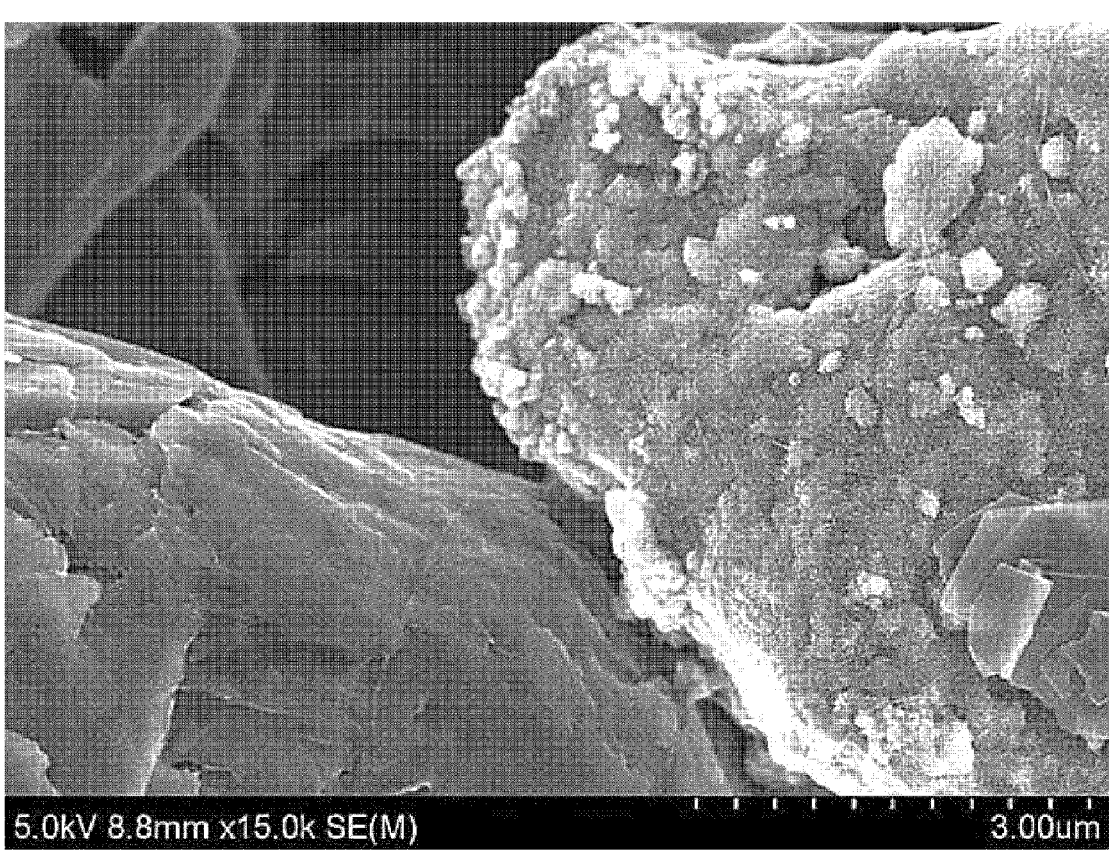
FIG. 4 is an SEM image showing a composite negative electrode active material of Comparative Example 2.

Referring to FIG. 4, it can be seen that, in the composite negative electrode active material of Comparative Example 2, the SWCNTs are excessively attached to the silicon-based core particles. Thus, in the case of Comparative Example 2, it is considered that it is difficult to form a conductive network by the SWCNTs.

Figure 5:
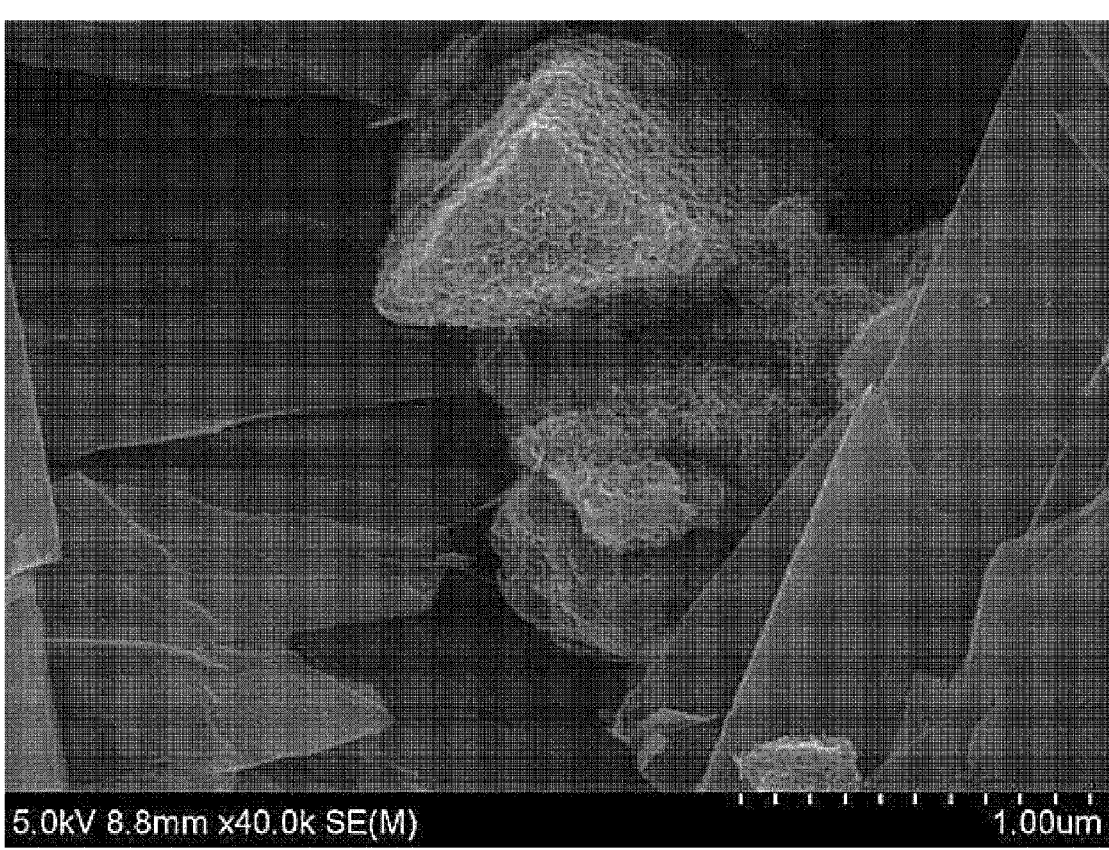
FIG. 5 is an SEM image showing a negative electrode active material of Comparative Example 4.

Referring to FIG. 5, it can be seen that the SWCNTs are not attached on the silicon-based core particles and are dispersed because the negative electrode active material of Comparative Example 4 was not heat-treated during preparation.

Experimental Example 2 Measurement of Oxygen Content in Outer Carbon Coating Layer An x-ray photoelectron spectroscopy (XPS) depth profile of the composite negative electrode active material of each of Examples 1 to 4 and Comparative Examples 1 to 3 was measured. Through the XPS depth profile, the boundary between the inner carbon coating layer and the outer carbon coating layer was distinguished according to the presence or absence of oxygen (O), and an oxygen content in the outer carbon coating layer was measured, and the results are shown in Table 1 below.

TABLE 1

|  | Oxygen content in outer carbon coating layer (based on total weight of outer carbon coating layer, wt %) |
| --- | --- |
| Example 1 | 49.1 |
| Example 2 | 53.2 |
| Example 3 | 48.9 |
| Example 4 | 49.8 |
| Comparative Example 1 | 59.5 |
| Comparative Example 2 | 32.9 |
| Comparative Example 3 | 50.1 |

Referring to Table 1, it can be evaluated that, in the composite negative electrode active materials of Examples 1 to 4, the oxygen content in the outer carbon coating layer was adjusted to an appropriate level, so that a composite of the silicon-based core particles and SWCNTs was formed at the desired level as compared to those of Comparative Examples 1 and 2.

In Comparative Example 3, the MWCNTs were used instead of the SWCNTs, and the oxygen content in the outer carbon coating layer was adjusted to an appropriate level, but as will be described below, the MWCNTs could not form a flexible and stable conductive network, and thus lifespan characteristics were poor.

Experimental Example 3: Evaluation of Lifespan Characteristics

Manufacture of Negative Electrode

A negative electrode material was prepared by mixing the composite negative electrode active material prepared in Example 1 and natural graphite as a carbon-based active material (average particle diameter ($D_{50}$): 15 μm) in a weight ratio of 15:85.

The negative electrode material, styrene-butadiene rubber (SBR) as a binder, and carboxymethylcellulose as a thickener were mixed in a weight ratio of 98:1:1, and the mixture was added to distilled water as a solvent for forming a negative electrode slurry to prepare a negative electrode slurry.

The negative electrode slurry was applied in a loading amount of 3 mAh/cm$^2$ onto one surface of a copper current collector (thickness: 15 μm) as a negative electrode current collector, roll-pressed, and dried in a 130° C. vacuum oven for 10 hours to form a negative electrode active material layer (thickness: 42 μm), and the resultant was used as a negative electrode (the negative electrode having a thickness of 57 pm and an area of 1.4875 cm$^2$, and having a circular shape) according to Example 1.

Further, negative electrodes of Examples 2 to 4 and Comparative Examples 1 to 5 were manufactured in the same manner as in Example 1, except that the negative electrode active materials of Examples 2 to 4 and Comparative Examples 1 to 5 were respectively used instead of the composite negative electrode active material of Example 1.

Manufacture of Secondary Battery

A lithium metal thin film having an area of 1.7671 cm$^2$ and having a circular shape was used as a positive electrode.

A polyethylene separator was interposed between each of the negative electrodes prepared above and the positive electrode, and an electrolyte solution was injected to prepare a coin-type half-cell secondary battery.

The electrolyte solution was obtained by dissolving vinylene carbonate (VC) at 0.5 wt % and LiPF6 at a concentration of 1 M in a solution in which ethyl methyl carbonate (EMC) and ethylene carbonate (EC) were mixed at a volume ratio of 7:3.

Evaluation of Capacity Retention Rate

The cycle capacity retention rate of each of the secondary batteries prepared in Examples 1 to 4 and Comparative Examples 1 to 5 was evaluated using an electrochemical charging and discharging device.

The cycle capacity retention rate was measured by charging and discharging at 0.1 C for a first cycle and a second cycle, and charging and discharging at 0.5 C from a third cycle (charging conditions: constant current (CC)/constant voltage (CV), 5 mV/0.005 C cut-off, discharging conditions: CC, 1.5 V cut-off).

The capacity retention was calculated with the equation below, $$\text{capacity retention rate (\%)} = (\text{discharge capacity at Nth cycle/discharge capacity at 1st cycle}) \times 100$$

(where, N is an integer greater than or equal to 1).

Capacity retention rates after 100 cycles (%) are listed in Table 2 below.

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Capacity retention rate after 100 cycles (%) | 83.4 | 82.0 | 81.8 | 83.9 | 72.8 | 60.1 | 71.5 | 72.9 | 75.6 |

Referring to Table 2, it can be seen that, in the negative electrodes and the secondary batteries using the composite negative electrode active materials of Examples 1 to 4, the cycle capacity retention rate is improved to an excellent level compared to the materials of Comparative Examples 1 to 5.

The invention claimed is:

1. A composite negative electrode active material comprising:
   silicon-based core particles;
   an outer carbon coating layer present on the silicon-based core particles; and
   single-walled carbon nanotubes,
   wherein the single-walled carbon nanotubes contact the outer carbon coating layer and comprise a body partially spaced apart from the outer carbon coating layer,
   the outer carbon coating layer comprises oxygen in an amount of 40 wt % to 53.2 wt % therein, and
   the composite negative electrode active material further comprises an inner carbon coating layer formed between the silicon-based core particles and the outer carbon coating layer.

2. The composite negative electrode active material of claim 1, wherein the silicon-based core particles comprise a compound represented by Formula 1 below, $$M_xSiO_y \qquad \text{[Formula 1]}$$

wherein M is one or more selected from the group consisting of Li, Mg, and Al, $0 \leq x \leq 4$, and $0 \leq y < 2$.

3. The composite negative electrode active material of claim 1, wherein the single-walled carbon nanotubes have an average length of 3 μm or more.

4. The composite negative electrode active material of claim 1, wherein the single-walled carbon nanotubes have an average diameter of 0.1 nm to 15 nm.

5. The composite negative electrode active material of claim 1, wherein the single-walled carbon nanotubes are present in an amount of 0.005 wt % to 0.2 wt % in the composite negative electrode active material.

6. The composite negative electrode active material of claim 1, wherein a part of the single-walled carbon nanotubes contacts the outer carbon coating layer, and wherein the body partially spaced apart from the outer carbon coating layer is exposed to an outside of the composite negative electrode active material.

7. The composite negative electrode active material of claim 1, wherein the single-walled carbon nanotubes contacting the outer carbon coating layer and comprising the body partially spaced apart from the outer carbon coating layer form a conductive network between the single-walled carbon nanotubes and the silicon-based core particles.

8. A negative electrode comprising:
   a negative electrode current collector; and
   a negative electrode active material layer formed on the negative electrode current collector,
   wherein the negative electrode active material layer comprises a negative electrode material comprising the composite negative electrode active material of claim 1, a binder, and a conductive material.

9. The negative electrode of claim 8, wherein
   the negative electrode material further comprises a carbon-based active material, and
   the negative electrode material comprises the composite negative electrode active material and the carbon-based active material in a weight ratio of 5:95 to 30:70.

10. A secondary battery comprising:
    the negative electrode of claim 8;
    a positive electrode facing the negative electrode;
    a separator interposed between the negative electrode and the positive electrode; and
    an electrolyte.

11. A method of preparing the composite negative electrode active material of claim 1, the method comprising the steps of:
    mixing silicon-based core particles, a precursor for forming an outer carbon coating layer, and single-walled carbon nanotubes; and
    heat-treating the resulting mixture at 250° C. to 650° C.

12. The method of claim 11, wherein the step of heat-treating the mixture is performed for 0.5 hours to 5 hours.

13. The method of claim 11, wherein the precursor for forming the outer carbon coating layer comprises one or more selected from the group consisting of carboxymethyl cellulose, methyl cellulose, hydroxypropyl cellulose, methyl hydroxypropyl cellulose, ethyl hydroxyethyl cellulose, methyl ethyl hydroxyethyl cellulose, and cellulose gum.

14. The method of claim 11, further comprising a step of forming the inner carbon coating layer on the silicon-based core particles before the mixing step.

15. The method of claim 14, wherein the forming of the inner carbon coating layer is performed by a chemical vapor deposition (CVD) method using one or more hydrocarbon gases selected from the group consisting of methane, ethane, and acetylene.

*   *   *   *   *